US010395830B2

(12) United States Patent
Watabe et al.

(10) Patent No.: US 10,395,830 B2
(45) Date of Patent: Aug. 27, 2019

(54) MULTI-LAYER CERAMIC ELECTRONIC COMPONENT

(71) Applicant: Taiyo Yuden Co., Ltd., Tokyo (JP)

(72) Inventors: Masataka Watabe, Tokyo (JP); Yasutomo Suga, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/881,433

(22) Filed: Jan. 26, 2018

(65) Prior Publication Data

US 2018/0218840 A1 Aug. 2, 2018

(30) Foreign Application Priority Data

Jan. 27, 2017 (JP) .................................. 2017-012890

(51) Int. Cl.
*H01G 4/012* (2006.01)
*H01G 4/248* (2006.01)
*H01G 4/232* (2006.01)
*H01G 4/30* (2006.01)
*H01G 4/12* (2006.01)

(52) U.S. Cl.
CPC ............. *H01G 4/248* (2013.01); *H01G 4/232* (2013.01); *H01G 4/30* (2013.01); *H01G 4/012* (2013.01); *H01G 4/1218* (2013.01); *H01G 4/1227* (2013.01); *H01G 4/1236* (2013.01); *H01G 4/1245* (2013.01)

(58) Field of Classification Search
CPC ............ H01G 4/30; H01G 4/32; H01G 4/005; H01G 4/006; H01G 4/012; H01G 4/12; H01G 4/248; H01G 4/1227
See application file for complete search history.

(56) References Cited

U.S. PATENT DOCUMENTS

| 2014/0209363 A1* | 7/2014 | Oh | ..................... B24B 31/0218 174/260 |
| 2015/0016018 A1* | 1/2015 | Onishi | ................... H01G 4/005 361/301.4 |
| 2015/0185189 A1 | 7/2015 | Zhang et al. | |

(Continued)

FOREIGN PATENT DOCUMENTS

JP 2014-130999 A 7/2014

*Primary Examiner* — Nguyen T Ha
(74) *Attorney, Agent, or Firm* — Saliwanchik, Lloyd & Eisenschenk

(57) ABSTRACT

A multi-layer ceramic electronic component includes: a ceramic body including first and second main surfaces oriented in a first axial direction, first and second end surfaces oriented in a second axial direction orthogonal to the first axial direction, a first internal electrode drawn to the first end surface, and a second internal electrode facing the first internal electrode and being drawn to the second end surface, the ceramic body being formed to be long in a third axial direction orthogonal to the first and second axial directions, a dimension of the ceramic body in the first axial direction being 80 μm or less; a first external electrode covering the first end surface and extending from the first end surface to the first and second main surfaces; and a second external electrode covering the second end surface and extending from the second end surface to the first and second main surfaces.

4 Claims, 6 Drawing Sheets

(56) References Cited

U.S. PATENT DOCUMENTS

| | | | |
|---|---|---|---|
| 2015/0340155 A1* | 11/2015 | Fukunaga | H01G 4/012 361/301.4 |
| 2016/0093438 A1* | 3/2016 | Sasabayashi | H01G 4/12 174/260 |
| 2016/0093444 A1* | 3/2016 | Itamura | H01G 4/248 174/260 |
| 2016/0095223 A1* | 3/2016 | Yoshida | H01G 4/2325 174/260 |
| 2017/0162328 A1* | 6/2017 | Ota | H01C 7/18 |

* cited by examiner

MULTI-LAYER CERAMIC ELECTRONIC COMPONENT

CROSS-REFERENCE TO RELATED APPLICATION

This application claims the benefit under 35 U.S.C. § 119 of Japanese Patent Application No. 2017-012890, filed Jan. 27, 2017, the disclosure of which is herein incorporated by reference in its entirety.

BACKGROUND

The present invention relates to a low-profile multi-layer ceramic electronic component.

Along with miniaturization of electronic devices, there are demands for reduction in height of multi-layer ceramic electronic components. Japanese Patent Application Laid-open No. 2014-130999 (hereinafter, referred to as Patent Document 1) discloses a low-profile multi-layer ceramic capacitor. In this multi-layer ceramic capacitor, external electrodes are made thinner, and a ceramic body is made thicker accordingly, thus ensuring strength in a thickness direction.

SUMMARY

However, in the multi-layer ceramic capacitor, if the external electrodes are extremely made thinner, solder erosion may occur in the external electrodes at the time of mounting. As a result, it is necessary to ensure the thicknesses of the external electrodes to some extent. Therefore, there is a demand for a technique capable of ensuring strength of a multi-layer ceramic capacitor without thinning the external electrodes.

In view of the circumstances as described above, it is desirable to provide a low-profile multi-layer ceramic electronic component capable of ensuring flexural strength in a longitudinal direction.

According to an embodiment of the present invention, there is provided a multi-layer ceramic electronic component including a ceramic body, a first external electrode, and a second external electrode.

The ceramic body includes a first main surface and a second main surface that are oriented in a first axial direction, a first end surface and a second end surface that are oriented in a second axial direction orthogonal to the first axial direction, a first internal electrode that is drawn to the first end surface, and a second internal electrode that faces the first internal electrode and is drawn to the second end surface, the ceramic body being formed to be long in a third axial direction orthogonal to the first axial direction and the second axial direction, a dimension of the ceramic body in the first axial direction being 80 µm or less.

The first external electrode covers the first end surface and extends from the first end surface to the first main surface and the second main surface.

The second external electrode covers the second end surface and extends from the second end surface to the first main surface and the second main surface.

In this configuration, the thickness of the ceramic body is very small, and thus strength of the single ceramic body in the thickness direction is lowered. However, the first external electrode and the second external electrode are provided along the longitudinal direction of the ceramic body, and the ceramic body is reinforced by the first external electrode and the second external electrode. As a result, in this multi-layer ceramic electronic component, flexural strength in the longitudinal direction can be ensured as a whole of the ceramic body and the first and second external electrodes.

A thickness of each of the first external electrode and the second external electrode on the first main surface and the second main surface may be 2 µm or more.

In this configuration, solder erosion in the first external electrode and the second external electrode can be effectively inhibited at the time of mounting of the multi-layer ceramic electronic component.

The dimension of the ceramic body in the first axial direction may be equal to or smaller than one-fifth of a dimension of the ceramic body in the third axial direction.

In this configuration, the strength of the ceramic body in the thickness direction is further lowered. Thus, a configuration to reinforce the ceramic body by the external electrodes is particularly effective.

It is possible to provide a low-profile multi-layer ceramic electronic component capable of ensuring flexural strength in a longitudinal direction.

These and other objects, features and advantages of the present invention will become more apparent in light of the following detailed description of embodiments thereof, as illustrated in the accompanying drawings.

DETAILED DESCRIPTION OF EMBODIMENTS

Hereinafter, an embodiment of the present invention will be described with reference to the drawings.

In the figures, an X axis, a Y axis, and a Z axis orthogonal to one another are shown as appropriate. The X axis, the Y axis, and the Z axis are common in all figures.

1. Configuration of Multi-Layer Ceramic Capacitor 10

Figure 1:
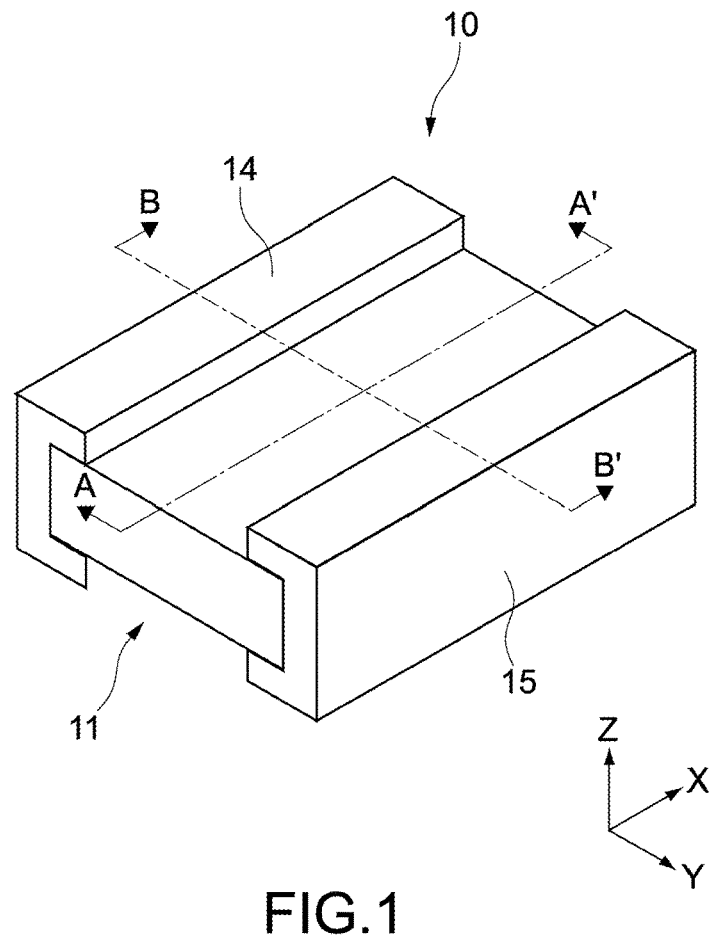
FIG. 1 is a perspective view of a multi-layer ceramic capacitor according to an embodiment of the present invention.
Figure 2:
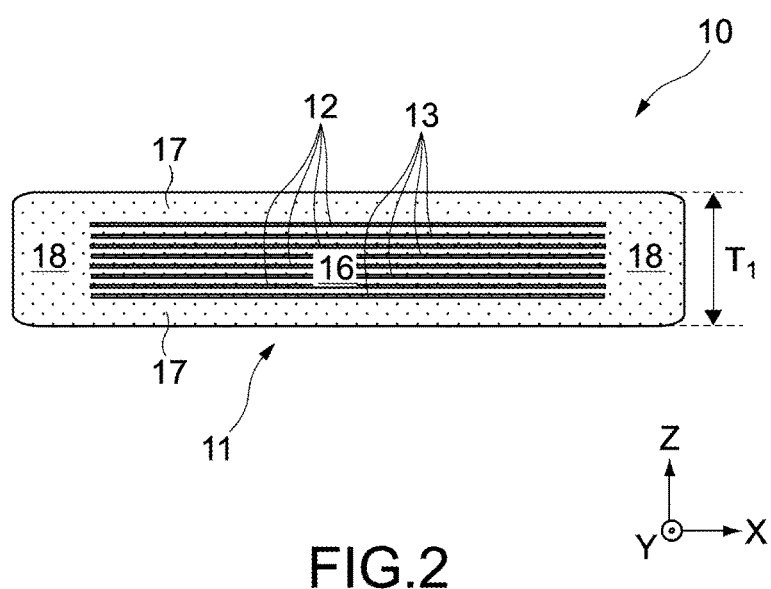
FIG. 2 is a cross-sectional view of the multi-layer ceramic capacitor taken along the A-A' line in FIG. 1.
Figure 3:
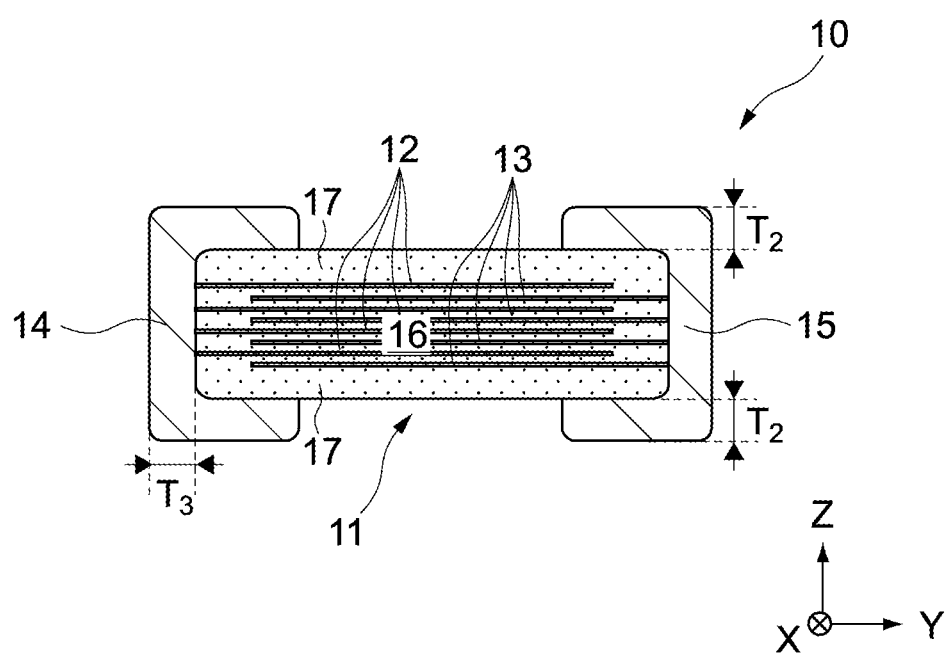
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 is formed to have a low profile. For example, the thickness (dimension in a Z-axis direction) of the multi-layer ceramic capacitor 10 can be set to 100 µm or less. Further, in the multi-layer ceramic capacitor 10, for example, a dimension in a longitudinal direction (X-axis direction) can be set in the range of 0.5 mm to 2.0 mm, and a dimension in a lateral direction (Y-axis direction) can be set in the range of 0.2 mm to 1.0 mm.

More specifically, the size of the multi-layer ceramic capacitor 10 can be set to, for example, 0.6 mm by 0.3 mm by 50 µm, 1.0 mm by 0.5 mm by 80 µm, or 1.6 mm by 0.8 mm by 100 µm. As a matter of course, the multi-layer ceramic capacitor 10 can have various sizes other than the sizes describe above.

The multi-layer ceramic capacitor 10 includes a ceramic body 11, a first external electrode 14, and a second external electrode 15. The ceramic body 11 is formed as a main body of the multi-layer ceramic capacitor 10 and formed to be long in the X-axis direction. Each of the first external electrode 14 and the second external electrode 15 partially covers the surface of the ceramic body 11.

The ceramic body 11 has a hexahedral shape having two side surfaces oriented in the X-axis direction, two end surfaces oriented in the Y-axis direction, and two main surfaces oriented in the Z-axis direction. It should be noted that the ceramic body 11 may not have the hexahedral shape in a precise sense. For example, the surfaces of the ceramic body 11 may be curved surfaces, and the ceramic body 11 may be rounded as a whole.

A thickness $T_1$, which is the dimension of the ceramic body 11 in the Z-axis direction, is 80 µm or less. In this manner, the thickness $T_1$ of the ceramic body 11 is made very small, and thus the thickness of the multi-layer ceramic capacitor 10 can be set to 100 µm or less also when the thicknesses of the first external electrode 14 and the second external electrode 15 are ensured to some extent.

Meanwhile, when the thickness $T_1$ of the ceramic body 11 is made very small, a ratio (aspect ratio) of the dimension in the longitudinal direction to the thickness $T_1$ in the ceramic body 11 is increased. This reduces flexural strength in the longitudinal direction in the ceramic body 11, and mechanical damage such as a crack becomes prone to occur due to stress in the thickness direction that is applied to the center portion of the ceramic body 11 in the longitudinal direction.

In the ceramic body 11, when the thickness $T_1$ is equal to or smaller than one-fifth of the dimension in the longitudinal direction, mechanical damage is particularly prone to occur. Although it is assumed that the stress in the thickness direction is applied to the ceramic body 11 at various timings, in particular, there is a demand to withstand the stress in the thickness direction that is applied at the time of mounting of the multi-layer ceramic capacitor 10.

In other words, the multi-layer ceramic capacitor 10 is mounted to a substrate by use of a chip mounter that holds the center portion of one of the main surfaces of the ceramic body 11 by suction. At that time, the stress in the thickness direction is applied from the chip mounter to the main surface of the ceramic body 11. With the single ceramic body 11, flexural strength to withstand the stress described above may be difficult to obtain.

The first external electrode 14 covers one of the end surfaces of the ceramic body 11, and the second external electrode 15 covers the other end surface of the ceramic body 11. The first external electrode 14 and the second external electrode 15 extend from the respective end surfaces of the ceramic body 11 to both the main surfaces and are separated from each other in the Y-axis direction on both the main surfaces. The first external electrode 14 and the second external electrode 15 are provided over the entire range of the ceramic body 11 in the longitudinal direction.

In other words, both ends of the ceramic body 11 in the lateral direction are covered with the first external electrode 14 and the second external electrode 15 each having a U-shaped cross section. With this configuration, the ceramic body 11 is reinforced by the first external electrode 14 and the second external electrode 15 along the longitudinal direction. As a result, in the multi-layer ceramic capacitor 10, flexural strength can be ensured as a whole of the ceramic body 11 and the first and second external electrodes 14 and 15.

In the multi-layer ceramic capacitor 10, in order to inhibit solder erosion in the first external electrode 14 and the second external electrode 15, it is necessary to ensure the thicknesses of the first external electrode 14 and the second external electrode 15 to some extent. Specifically, a thickness $T_2$, which is the dimension of each of the first and second external electrodes 14 and 15 in the Z-axis direction on each main surface of the ceramic body 11, is desirably 2 µm or more, and more desirably 5 µm or more.

Further, in the multi-layer ceramic capacitor 10, as the thickness $T_2$ of each of the first and second external electrodes 14 and 15 on each main surface of the ceramic body 11 becomes larger, it is necessary to make the thickness $T_1$ of the ceramic body 11 smaller. As a result, the thickness $T_2$ of each of the first and second external electrodes 14 and 15 on each main surface of the ceramic body 11 is desirably 20 µm or less, and more desirably 10 µm or less.

It should be noted that a thickness $T_3$, which is the dimension of each of the first and second external electrodes 14 and 15 in the Y-axis direction on each end surface of the ceramic body 11, is also desirably 2 µm or more, and more desirably 5 µm or more, and is desirably 20 µm or less, and more desirably 10 µm or less, as in the case of the thickness $T_2$.

The thicknesses $T_2$ and $T_3$ of each of the first and second external electrodes 14 and 15 may not be made uniform. In this case, the thicknesses $T_2$ and $T_3$ of each of the first and second external electrodes 14 and 15 can be defined as the maximum value of the thickness of each of the first and second external electrodes 14 and 15 on each surface of the ceramic body 11. The thickness $T_2$ and the thickness $T_3$ in each of the first external electrode 14 and the second external electrode 15 may be nearly equal to or different from each other.

The first external electrode 14 and the second external electrode 15 are each formed of a good conductor of electricity and function as terminals of the multi-layer ceramic capacitor 10. Examples of the good conductor of electricity forming the first external electrode 14 and the second external electrode 15 include a metal mainly containing nickel (Ni), copper (Cu), palladium (Pd), platinum (Pt), silver (Ag), gold (Au), or the like, and an alloy of those metals.

The first external electrode 14 and the second external electrode 15 are not limited to a specific configuration. For example, the first external electrode 14 and the second external electrode 15 may have a single-layer structure or multi-layer structure. The first and second external electrodes 14 and 15 of the multi-layer structure may be formed to have a double-layer structure including a base film and a surface film, or a three-layer structure including a base film, an intermediate film, and a surface film, for example.

The base film can mainly contain nickel (Ni), copper (Cu), palladium (Pd), platinum (Pt), silver (Ag), or gold (Au), for example. In this embodiment, the base film is formed by sputtering. However, the base film can also be formed by, for example, dipping, spraying, or printing other than sputtering.

The intermediate film can mainly contain platinum (Pt), palladium (Pd), gold (Au), copper (Cu), or nickel (Ni), for example. The surface film can mainly contain copper (Cu), tin (Sn), palladium (Pd), gold (Au), or zinc (Zn), for example. The intermediate film and the surface film can be formed by plating, for example.

The ceramic body 11 includes a capacitance forming unit 16, covers 17, and side margins 18. The capacitance forming unit 16 is disposed at the center portion of the ceramic body 11 in the X- and Z-axis directions. The covers 17 cover the capacitance forming unit 16 from the Z-axis direction, and the side margins 18 cover the capacitance forming unit 16 from the X-axis direction.

More specifically, the covers 17 are disposed on both sides of the capacitance forming unit 16 in the Z-axis direction. The side margins 18 are disposed on both sides of the capacitance forming unit 16 in the X-axis direction. The covers 17 and the side margins 18 have main functions of protecting the capacitance forming unit 16 and ensuring insulation properties of the periphery of the capacitance forming unit 16.

The capacitance forming unit 16 includes a plurality of first internal electrodes 12 and a plurality of second internal electrodes 13. The first internal electrodes 12 and the second internal electrodes 13 each have a sheet-like shape extending along an X-Y plane and are alternately disposed along the Z-axis direction. The first internal electrodes 12 and the second internal electrodes 13 face each other in the Z-axis direction in the capacitance forming unit 16.

Figure 4:
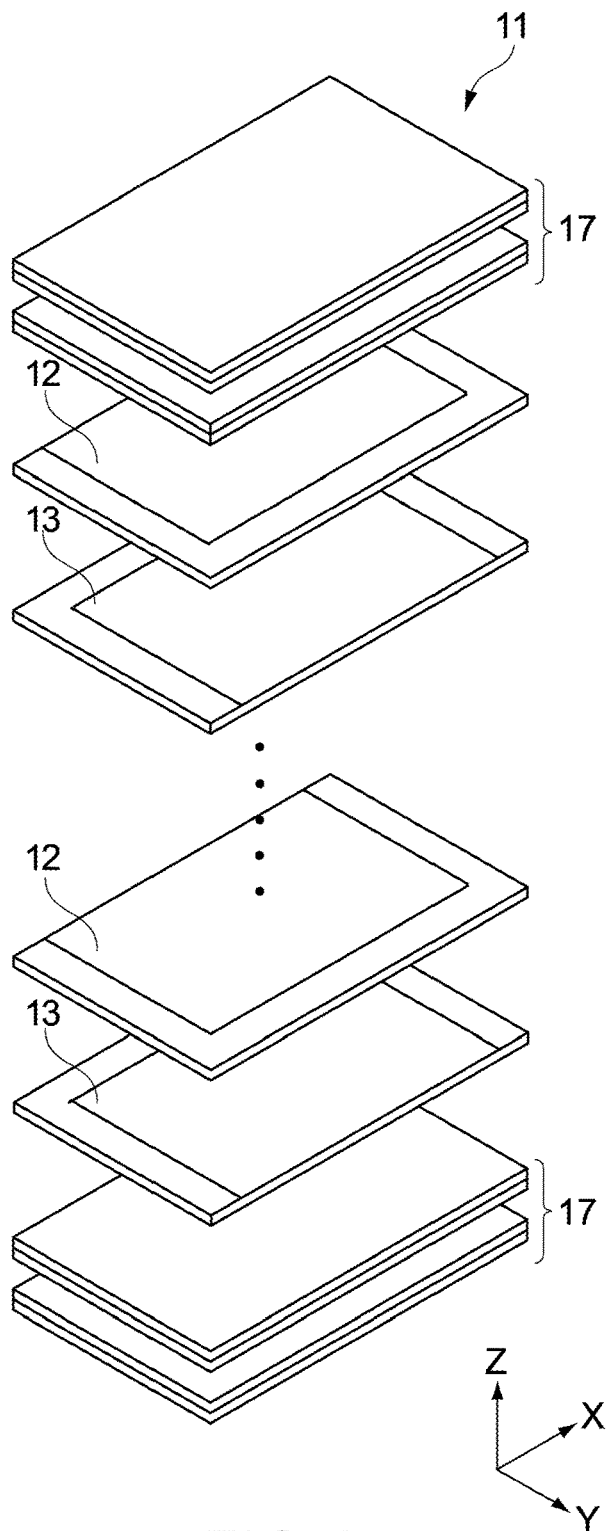
FIG. 4 is an exploded perspective view of a ceramic body of the multi-layer ceramic capacitor.

FIG. 4 is an exploded perspective view of the ceramic body 11. The ceramic body 11 has a structure in which sheets are laminated as shown in FIG. 4. The capacitance forming unit 16 and the side margins 18 can be formed of sheets on which the first internal electrodes 12 and the second internal electrodes 13 are printed. The covers 17 can be formed of sheets on which the first internal electrodes 12 and the second internal electrodes 13 are not printed.

As shown in FIG. 3, the first internal electrodes 12 are drawn to the end surface of the ceramic body 11 on the first external electrode 14 side and are connected to the first external electrode 14. The second internal electrodes 13 are drawn to the end surface of the ceramic body 11 on the second external electrode 15 side and are connected to the second external electrode 15. With this configuration, the first internal electrodes 12 and the second internal electrodes 13 are electrically continuous with the first external electrode 14 and the second external electrode 15, respectively.

Further, the first internal electrodes 12 are disposed with a gap between the first internal electrodes 12 and the second external electrode 15, and are insulated from the second external electrode 15. The second internal electrodes 13 are disposed with a gap between the second internal electrodes 13 and the first external electrode 14, and are insulated from the first external electrode 14. In other words, the first internal electrodes 12 are electrically continuous with only the first external electrode 14, and the second internal electrodes 13 are electrically continuous with only the second external electrode 15.

The first internal electrodes 12 and the second internal electrodes 13 are each formed of a good conductor of electricity and function as internal electrodes of the multi-layer ceramic capacitor 10. Examples of the good conductor of electricity forming the first and second internal electrodes 12 and 13 include a metal mainly containing nickel (Ni), copper (Cu), palladium (Pd), platinum (Pt), silver (Ag), gold (Au), or the like, and an alloy of those metals.

The capacitance forming unit 16 is formed of dielectric ceramics. In the multi-layer ceramic capacitor 10, in order to increase capacitances of respective dielectric ceramic layers provided between the first internal electrodes 12 and the second internal electrodes 13, dielectric ceramics having a high dielectric constant is used as a material forming the capacitance forming unit 16. Examples of the dielectric ceramics having a high dielectric constant include a material having a Perovskite structure containing barium (Ba) and titanium (Ti), which is typified by barium titanate ($BaTiO_3$).

Further, examples of the dielectric ceramics forming the capacitance forming unit 16 may include a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, and a titanium oxide ($TiO_2$) based material, other than a barium titanate based material.

The covers 17 and the side margins 18 are also formed of dielectric ceramics. A material forming the covers 17 and the side margins 18 may be insulating ceramics, but if a material having a composition system similar to that of the capacitance forming unit 16 is used therefor, production efficiency is increased, and internal stress in the ceramic body 11 is suppressed.

With the configuration described above, when a voltage is applied between the first external electrode 14 and the second external electrode 15 in the multi-layer ceramic capacitor 10, the voltage is applied to the dielectric ceramic layers between the first internal electrodes 12 and the second internal electrodes 13 in the capacitance forming unit 16. With this configuration, the multi-layer ceramic capacitor 10 stores charge corresponding to the voltage applied between the first external electrode 14 and the second external electrode 15.

It should be noted that the configuration of the multi-layer ceramic capacitor 10 is not limited to a specific configuration, and a well-known configuration can be employed as appropriate depending on the size and performance expected for the multi-layer ceramic capacitor 10. For example, the number of first internal electrodes 12, the number of second internal electrodes 13, and the thickness of each of the dielectric ceramic layers between the first internal electrodes 12 and the second internal electrodes 13 can be determined as appropriate.

2. Action and Effect of Multi-layer Ceramic Capacitor 10

Figure 5:
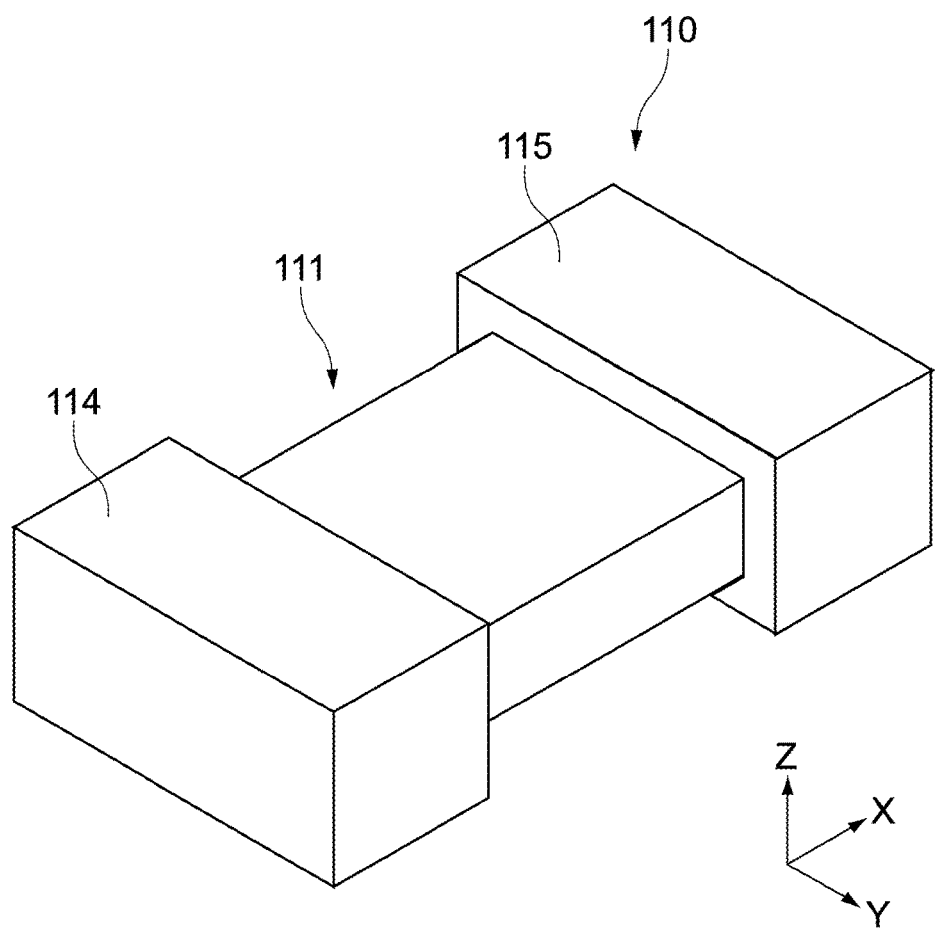
FIG. 5 is a perspective view of a multi-layer ceramic capacitor according to Comparative Example.

FIG. 5 is a perspective view of a multi-layer ceramic capacitor 110 according to Comparative Example. The multi-layer ceramic capacitor 110 is different from the multi-layer ceramic capacitor 10 according to this embodiment and has a general configuration in which external electrodes 114 and 115 are provided to both ends of a ceramic body 111 in the longitudinal direction (X-axis direction).

In the multi-layer ceramic capacitor 110 according to Comparative Example, the center portion in the longitudinal direction is constituted of only the ceramic body 111. Therefore, the flexural strength of the multi-layer ceramic capacitor 110 in the longitudinal direction is equal to that of the single ceramic body 111 in the longitudinal direction.

As a result, in the multi-layer ceramic capacitor 110, when a thickness $T_1$ of the ceramic body 111 is set to 80 μm or less, the flexural strength in the longitudinal direction becomes insufficient. Therefore, in the multi-layer ceramic capacitor 110, when stress in the thickness direction is applied to the center portion of the ceramic body 111 in the longitudinal direction at the time of mounting or the like, mechanical damage such as a crack is prone to occur.

Meanwhile, in the multi-layer ceramic capacitor 10 according to this embodiment, as described above, the ceramic body 11 is reinforced by the first external electrode 14 and the second external electrode 15 along the longitudinal direction. Therefore, higher flexural strength in the longitudinal direction is obtained in the multi-layer ceramic capacitor 10 than in the multi-layer ceramic capacitor 110 according to Comparative Example.

In other words, in the multi-layer ceramic capacitor 10 according to this embodiment, the first external electrode 14 and the second external electrode 15 are changed from the general configuration, and thus the flexural strength in the longitudinal direction can be improved. Therefore, in the multi-layer ceramic capacitor 10, mechanical damage can be inhibited without adding a new configuration.

Additionally, in the multi-layer ceramic capacitor 10 according to this embodiment, the first external electrode 14 and the second external electrode 15 are provided to both ends of the ceramic body 11 in the lateral direction, and thus the first external electrode 14 and the second external electrode 15 are close to each other. As a result, in the multi-layer ceramic capacitor 10, equivalent series inductance (ESL) can be reduced.

3. Example

For each of the multi-layer ceramic capacitor 10 according to Example and the multi-layer ceramic capacitor 110 according to Comparative Example, seven types of samples were produced, which were different from one another in the thickness $T_1$ of the ceramic body 11 or 111. In each of the samples of the multi-layer ceramic capacitors 10 and 110, the dimension in the X-axis direction was set to 1.0 mm, and the dimension in the Y-axis direction was set to 0.5 mm.

The ceramic bodies 11 and 111 of the respective samples were each produced by sintering a chip, the chip being obtained by cutting a multi-layer of dielectric ceramic green sheets on which an electrical conductive paste for forming the internal electrodes is printed as appropriate. A sintering temperature for the ceramic bodies 11 and 111 was set to 1,000 to 1,400° C.

For the multi-layer ceramic capacitors 10 and 110, after consideration of the amount of shrinking at the time of sintering of the ceramic bodies 11 and 111, the number of laminated green sheets each having the thickness of 0.5 to 3 μm was adjusted, to produce seven types of samples in which the thickness $T_1$ of the ceramic body 11 or 111 is set to 10 μm, 20 μm, 30 μm, 40 μm, 50 μm, 60 μm, and 70 μm.

The first and second external electrodes 14 and 15 and external electrodes 114 and 115 of each sample were formed by plating treatment performed on the base films deposited by sputtering. In any sample, the thickness $T_2$ of each of the first and second external electrodes 14 and 15 and external electrodes 114 and 115 was set to 10 μm, through the adjustment of conditions for the plating treatment (current, time, and the like).

Figure 6A:
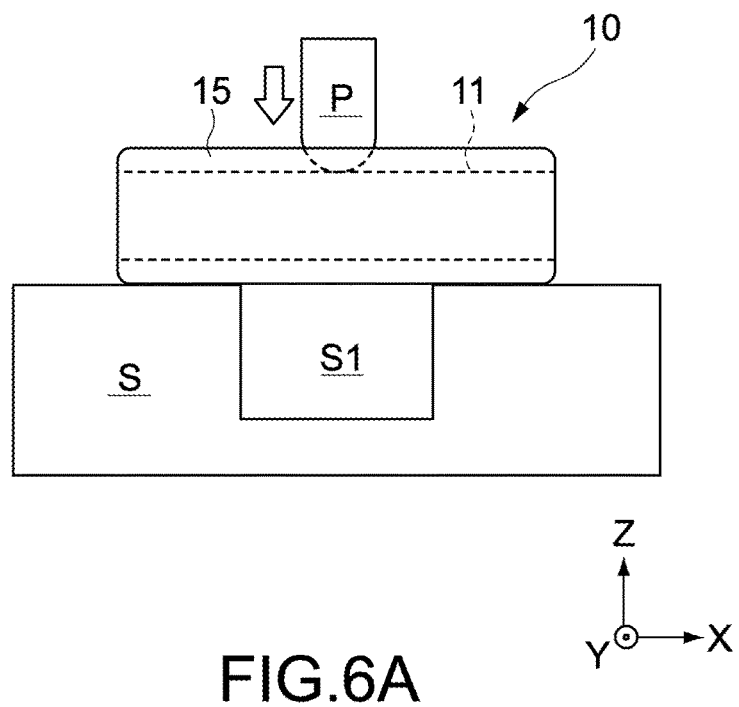
FIGS. 6A and 6B are schematic views for describing flexural strength measurement of multi-layer ceramic capacitors according to Example and Comparative Example.
Figure 6B:
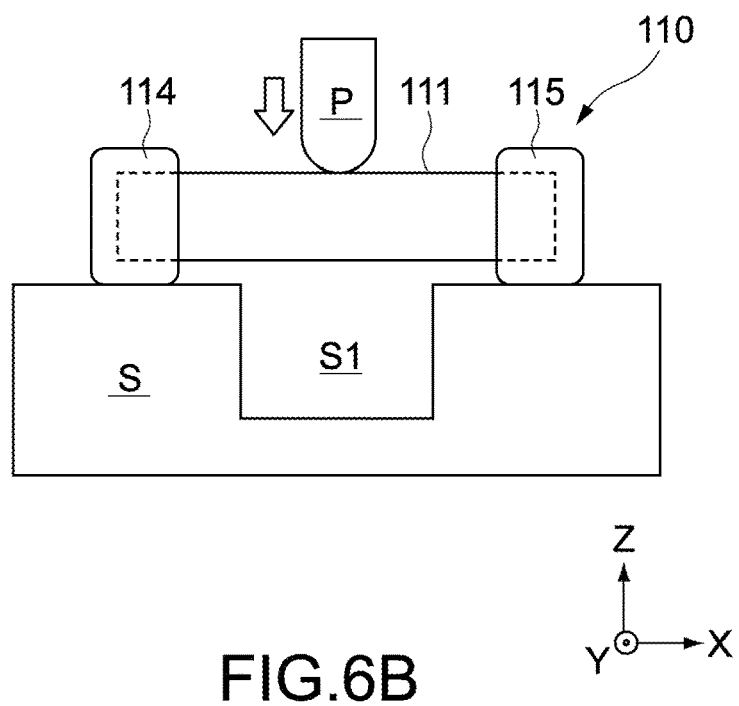

The flexural strength was measured for the samples of the multi-layer ceramic capacitors 10 and 110 that were obtained as described above. FIGS. 6A and 6B are schematic views for describing the flexural strength measurement. In the flexural strength measurement, a base S and a pusher P are used. The base S includes a recess S1 that is recessed downward in the Z-axis direction. The pusher P is disposed above the recess S1 of the base S in the Z-axis direction.

A dimension of the recess S1 of the base S in the X-axis direction is 0.6 times as large as the dimension of each sample in the longitudinal direction. Further, the lower end of the pusher P in the Z-axis direction is formed to have an arc-shaped cross section with a radius of 500 μm. Each sample is set on the base S so as to cross over the recess S1 in the longitudinal direction and such that the pusher P faces the center portion of the main surface of the ceramic body 11 or 111.

FIG. 6A shows a state where the sample of the multi-layer ceramic capacitor 10 according to Example is set on the base S. FIG. 6B shows a state where the sample of the multi-layer ceramic capacitor 110 according to Comparative Example is set on the base S. From this state, the pusher P is moved downward in the Z-axis direction, and stress is applied downward in the Z-axis direction until mechanical damage occurs in each sample.

Figure 7:
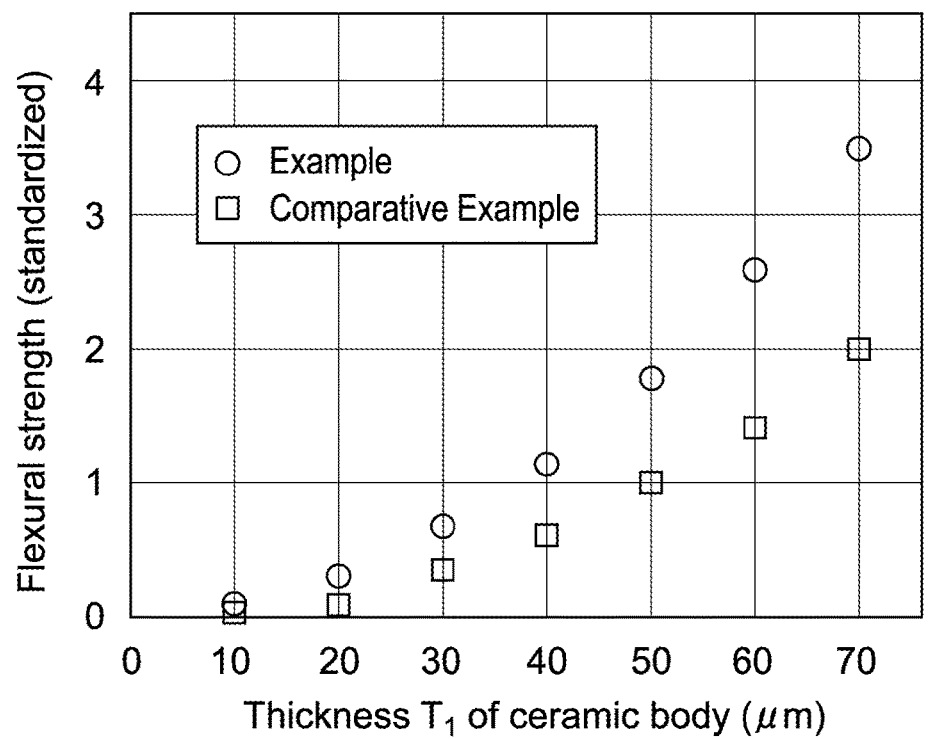
FIG. 7 is a graph showing results of the flexural strength measurement of the multi-layer ceramic capacitors according to Example and Comparative Example.

In this flexural strength measurement, a load applied to each sample from the pusher P was sequentially measured, and a load generated when mechanical damage occurs in each sample was assumed as flexural strength of each sample. FIG. 7 is a graph showing results of the flexural strength measurement of the samples. The horizontal axis of FIG. 7 represents the thickness $T_1$ of each of the ceramic bodies 11 and 111 of the samples, and the vertical axis of FIG. 7 represents the flexural strength of the samples.

It should be noted that the flexural strength shown in FIG. 7 is expressed by not a measured value of the load but a standardized value of the flexural strength of the samples, with "1" being set for the flexural strength of the sample of the multi-layer ceramic capacitor 110 according to Comparative Example where the thickness $T_1$ of the ceramic body 111 is 50 μm. In other words, the flexural strength shown in FIG. 7 is a relative value of the flexural strength of the respective samples.

Further, Table 1 is a graph showing specific values of plotted points of the respective samples shown in FIG. 7.

TABLE 1

| Thickness $T_1$ of ceramic body (μm) | Flexural strength (standardized) | |
|---|---|---|
| | Comparative Example | Example |
| 70 | 2.00 | 3.51 |
| 60 | 1.43 | 2.57 |
| 50 | 1.00 | 1.80 |
| 40 | 0.63 | 1.14 |
| 30 | 0.37 | 0.66 |
| 20 | 0.17 | 0.29 |
| 10 | 0.03 | 0.09 |

Referring to FIG. 7 and Table 1, in any thickness $T_1$ of the ceramic bodies 11 and 111, the multi-layer ceramic capacitor 10 according to Example acquires the flexural strength that is 1.5 times or more higher than that of the multi-layer ceramic capacitor 110 according to Comparative Example. In such a manner, it was experimentally confirmed that the multi-layer ceramic capacitor 10 of this embodiment acquires high flexural strength.

4. Other Embodiments

While the embodiment of the present invention has been described, the present invention is not limited to the embodiment described above, and it should be appreciated that the present invention may be variously modified.

For example, in the multi-layer ceramic capacitor 10, the first external electrode 14 and the second external electrode 15 may be extended from the end surfaces of the ceramic body 11 to not only the main surfaces but also the side surfaces. In other words, the first external electrode 14 and the second external electrode 15 of the multi-layer ceramic capacitor 10 may have not only U-shaped cross sections parallel to the Y-Z plane and but also U-shaped cross sections along the X-Y plane.

Further, in the embodiment described above, the multi-layer ceramic capacitor 10 has been described as an example of a multi-layer ceramic electronic component, but the present invention can be applied to any other multi-layer ceramic electronic components each including a pair of external electrodes. Examples of such multi-layer ceramic electronic components include a chip varistor, a chip thermistor, and a multi-layer inductor.

What is claimed is:

1. A multi-layer ceramic electronic component, comprising:
   a ceramic body including
      a first main surface,
      a second main surface,
      a first side surface and a second side surface each connecting the first main surface to the second main surface in a first axial direction,
      a first end surface and a second end surface connected to each other by each of the first main surface and the second main surface in a second axial direction orthogonal to the first axial direction, the first end surface and the second end surface each connecting the first main surface to the second main surface in the first axial direction, and each connecting the first side surface to the second side surface in a third axial direction perpendicular to both the first axial direction and the second axial direction,
      a first internal electrode that is drawn to the first end surface, and
      a second internal electrode that faces the first internal electrode and is drawn to the second end surface,
      a length of the ceramic body measured in the third axial direction being longer than both a length of the ceramic body measured in the first axial direction and a length of the ceramic body measured in the second axial direction, and
      the length of the ceramic body measured in the first axial direction being 80 μm or less;
   a first external electrode that covers the first end surface, a first portion of the first main surface and a first portion of the second main surface, and extends in the third axial direction from the first side surface to the second side surface; and
   a second external electrode that covers the second end surface, a second portion of the first main surface and a second portion of the second main surface, and extends in the third axial direction from the first side surface to the second side surface.

2. The multi-layer ceramic electronic component according to claim 1, wherein
   a thickness of each of the first external electrode and the second external electrode on the first main surface and the second main surface is 2 μm or more.

3. The multi-layer ceramic electronic component according to claim 1, wherein
   the length of the ceramic body measured in the first axial direction is equal to or smaller than one-fifth of the length of the ceramic body measured in the third axial direction.

4. The multi-layer ceramic electronic component according to claim 2, wherein
   the length of the ceramic body measured in the first axial direction is equal to or smaller than one-fifth of the length of the ceramic body measured in the third axial direction.

* * * * *